(12) United States Patent
Shyu et al.

(10) Patent No.: US 7,262,927 B1
(45) Date of Patent: Aug. 28, 2007

(54) AUTO-FOCUS LENS MODULE

(75) Inventors: San-Woei Shyu, Taipei (TW);
Shih-Chao Huang, Taipei (TW);
Hsien-Ru Chu, Taipei (TW)

(73) Assignee: E-Pin International Tech Co., Ltd., Taipei (TW)

( * ) Notice: Subject to any disclaimer, the term of this patent is extended or adjusted under 35 U.S.C. 154(b) by 0 days.

(21) Appl. No.: 11/385,791

(22) Filed: Mar. 22, 2006

(30) Foreign Application Priority Data

Dec. 29, 2005 (TW) .............................. 94222957 U

(51) Int. Cl.
*G02B 7/02* (2006.01)
*G02B 15/14* (2006.01)

(52) U.S. Cl. ................... 359/823; 369/44.14; 359/694; 359/696

(58) Field of Classification Search ................ 359/819, 359/821–824, 694, 696; 369/44.14
See application file for complete search history.

(56) References Cited

U.S. PATENT DOCUMENTS

| | | | | |
|---|---|---|---|---|
| 5,737,644 A | * | 4/1998 | Nomura et al. ............... | 396/72 |
| 5,886,836 A | * | 3/1999 | Sasaki et al. ............... | 359/823 |
| 2005/0243444 A1 | * | 11/2005 | Takeshita et al. ........... | 359/819 |
| 2006/0028929 A1 | * | 2/2006 | Osaka ..................... | 369/44.14 |

* cited by examiner

*Primary Examiner*—Scott J. Sugarman
*Assistant Examiner*—DaWayne A. Pinkney
(74) *Attorney, Agent, or Firm*—Troxell Law Office, PLLC

(57) ABSTRACT

An auto-focus lens module uses electromagnetic force to drive a lens moving for focusing. The auto-focus lens is composed by a lens holder, a coil and an upper frame clipped on outer circumference of a lens so as to form a lens holder set. And the coil is fixed between the lens holder and the upper frame so as to reduce diameter and volume of the coil. Two arched magnets are disposed on left and right sides of the coil and are positioned by a top cover so that the volume of the magnets is reduced. Two springs are disposed on two guide pins on opposite angles, elastically supported between the lens holder and the inner surface of the top cover for providing the lens holder homogeneous support while moving for focusing. Thereby, the components of the lens module are simplified, the volume of the device is minimized, and the lens holder moves stably for focusing.

3 Claims, 9 Drawing Sheets

AUTO-FOCUS LENS MODULE

BACKGROUND OF THE INVENTION

The present invention relates to an auto-focus lens module, especially to a lens module that uses electromagnetic force as well as spring compression force as driving force.

Either digital cameras or mobile phones with shooting function are disposed with a lens module that includes a focus adjusting device. The lens module available now has features of light weight, compact size, precision and durability. For example, it is guaranteed that the focus adjusting device should be operated at least two hundred thousand times without loosing. In conventional focus adjusting devices, electromagnetic force is used and the coils are surrounding a lens holder composed by a lens and a sleeve. A magnet arranged outside the coils is a circular magnet. Thus the volume occupied by the lens module is quite large, against the principle of compact design. Moreover, spring blades are used to balance the electromagnetic force. However, the spring blades are easy to be deformed by external forces such as vibration, rebounding or after being used for a long time so that the stability and accuracy of the movement of the lens holder have been affected.

SUMMARY OF THE INVENTION

Therefore it is a primary object of the present invention to provide an auto-focus lens module that includes a lens holder, a coil and an upper frame clipped on outer circumference of the lens so as to form a lens holder set. And the coil is fixed between the lens holder and the upper frame. Two arched magnets are disposed on left and right sides of the coil and are positioned by a top cover while two springs are disposed on two guide pins on opposite angles of an inner surface of a base, pressing against the inner surface of the top cover. Thereby, electromagnetic force and spring compression force are used as driving force for adjusting focus. Furthermore, the components are simplified, the volume is minimized, and the lens holder moves stably for focusing.

DETAILED DESCRIPTION OF THE PREFERRED EMBODIMENT

Figure 1:
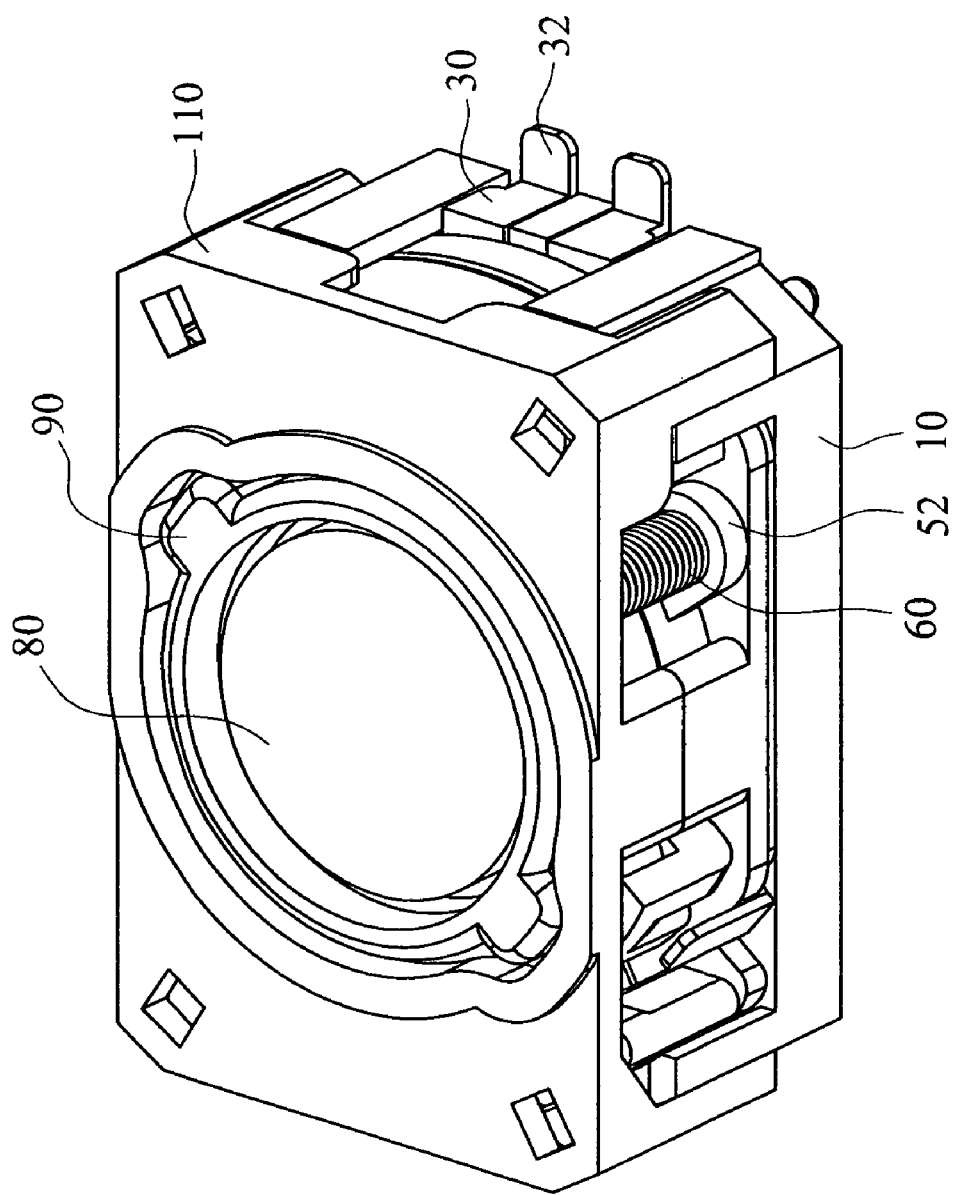
FIG. 1 is a perspective view of an embodiment in accordance with the present invention.
Figure 2:
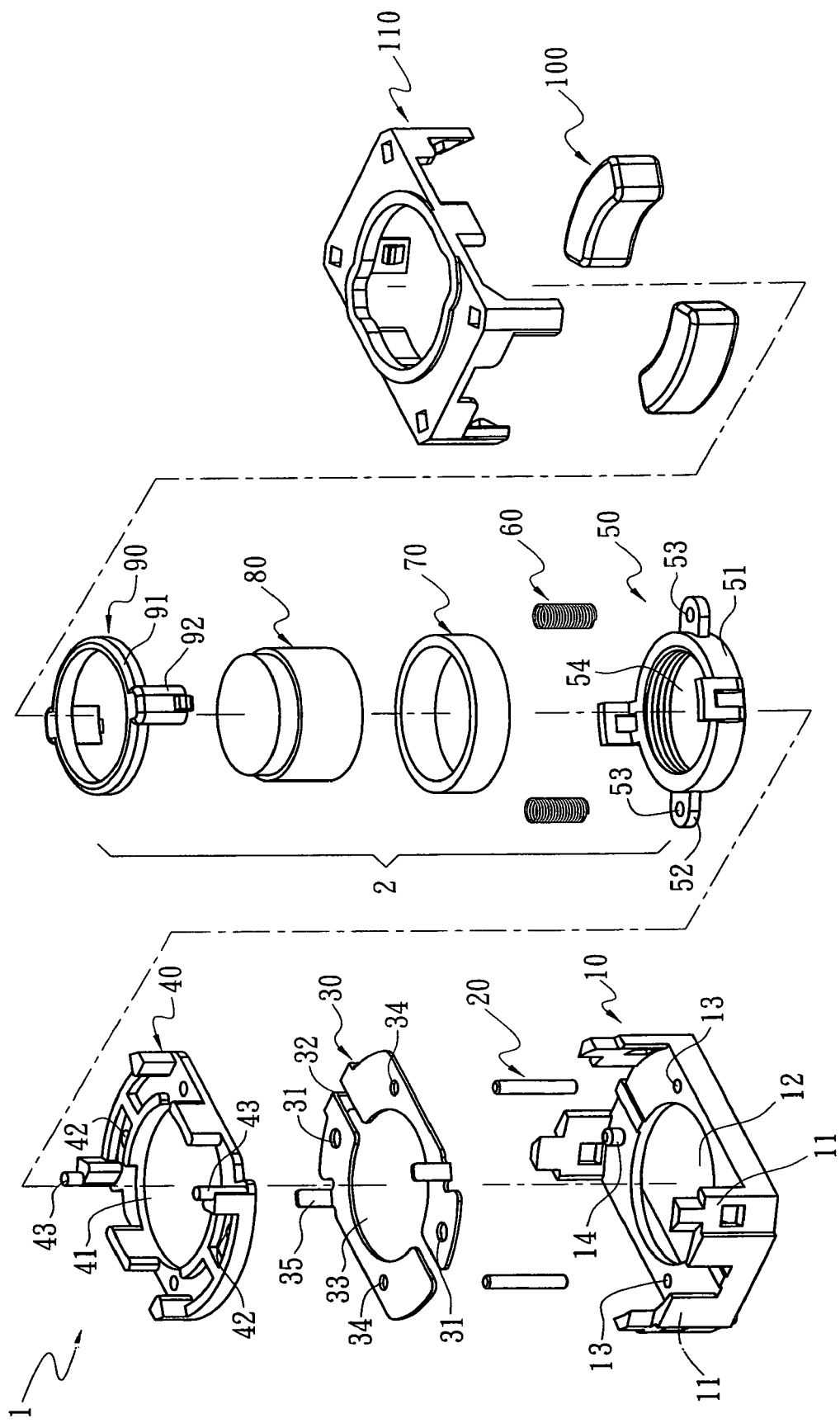
FIG. 2 is an explosive of the embodiment in FIG. 1.
Figure 3:
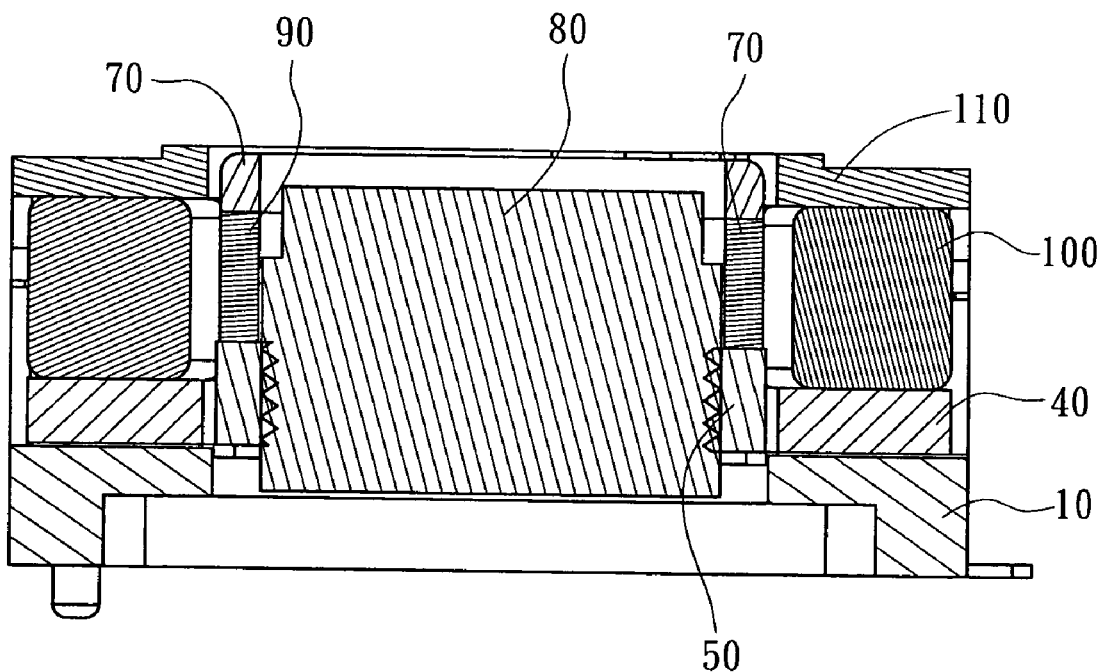
FIG. 3 is a cross sectional view of the embodiment in FIG. 1.
Figure 4:
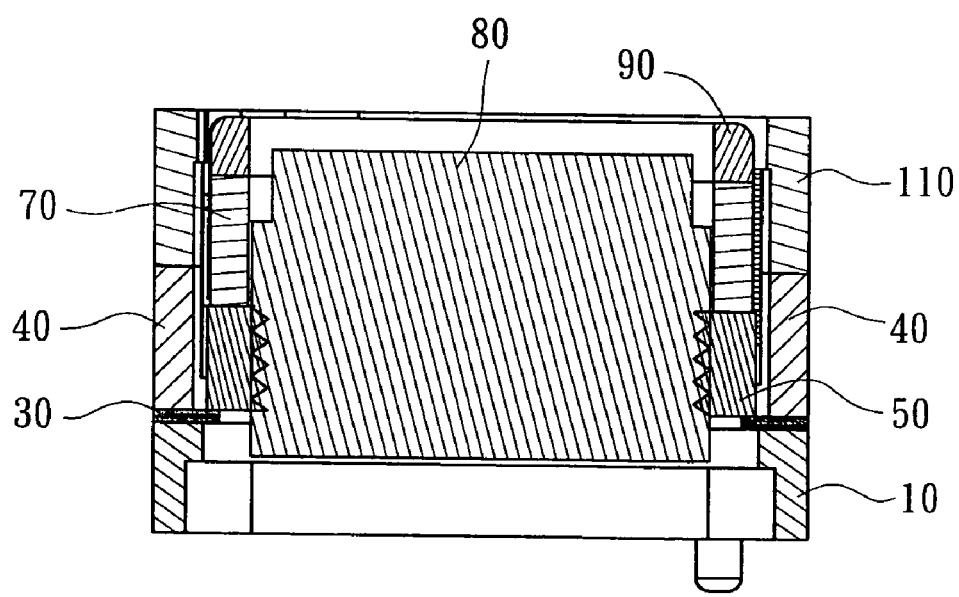
FIG. 4 is another cross sectional view of the embodiment in FIG. 1.

Refer from FIG. 1 to FIG. 4, a lens module 1 according to the present invention includes a base 10, two guide pins 20, two conductive plates 30, a bottom plate 40, a lens holder 50, two springs 60, a coil 70, a lens 80, a top plate 90, two magnets 100 and a top cover 110. Refer to FIG. 2, a lens holder set 2 composed by the lens holder 50, the coil 70 and the top plate 90 is clipped on circumference of the lens 80.

The lens holder set 2, together with the two guide pins 20, two copper plates 30, the bottom plate 40 and the two magnets 100 are disposed between the base 10 and the top cover 110 so as to form the lens module 1. The lens holder set 2 moves forward or backward inside the lens module 1 for focus adjustment of the lens 80.

Figure 5A:
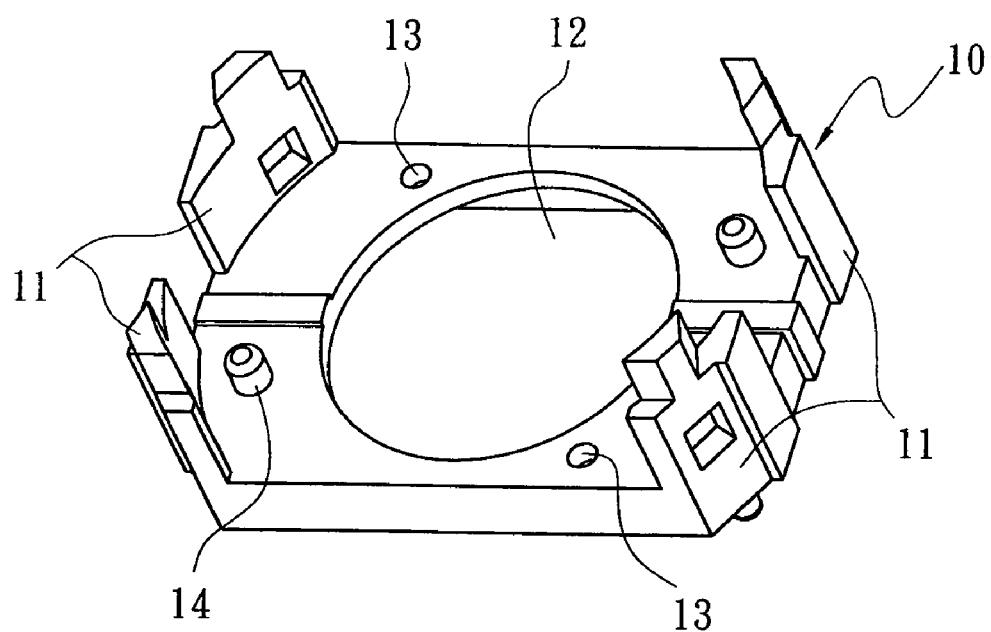
FIG. 5 (A)–5 (J) is a schematic drawing showing assembling of each components sequentially of an embodiment in accordance with the present invention.
Figure 5B:
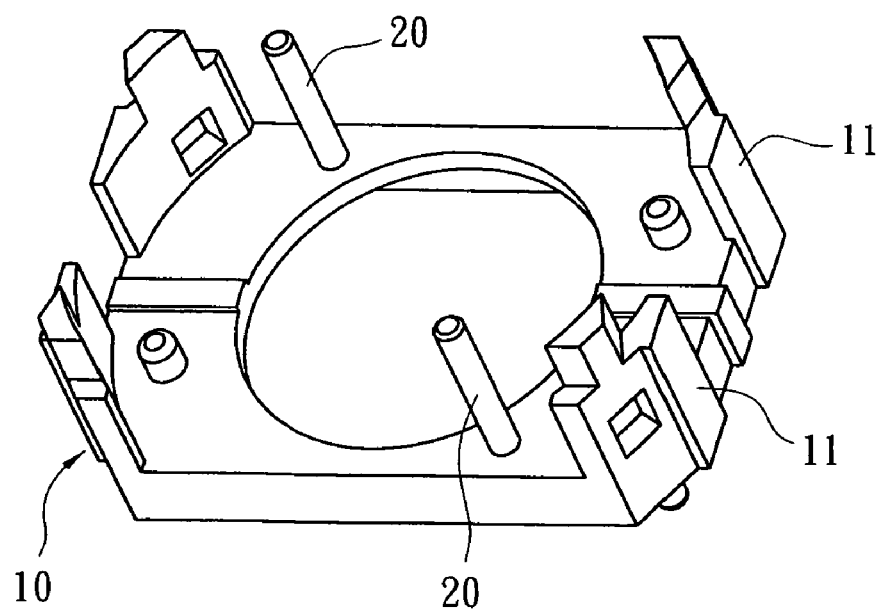
Figure 5C:
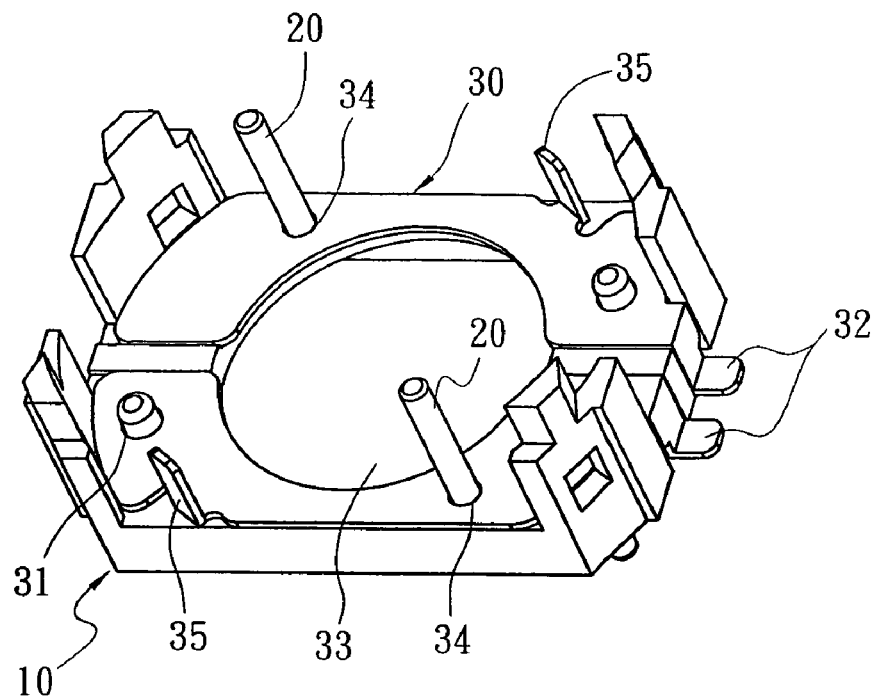
Figure 5D:
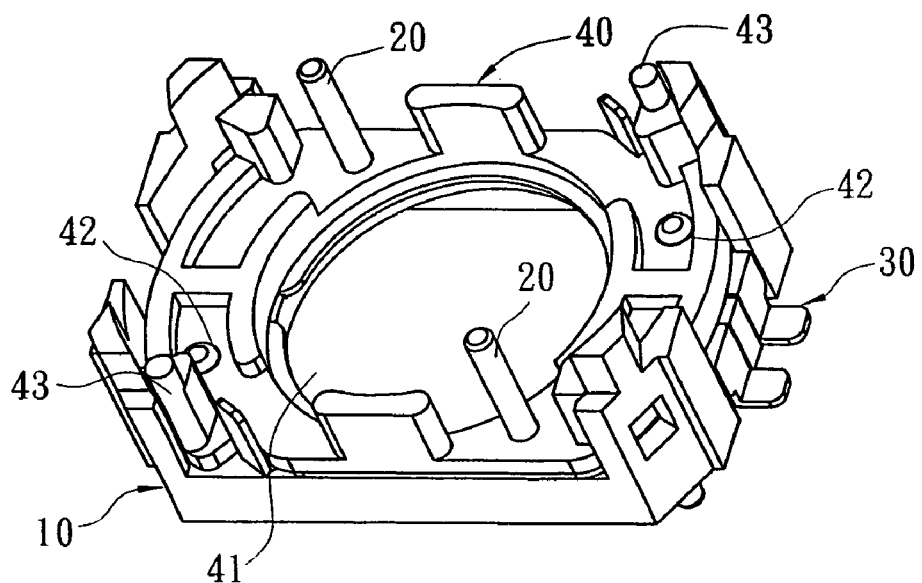
Figure 5E:
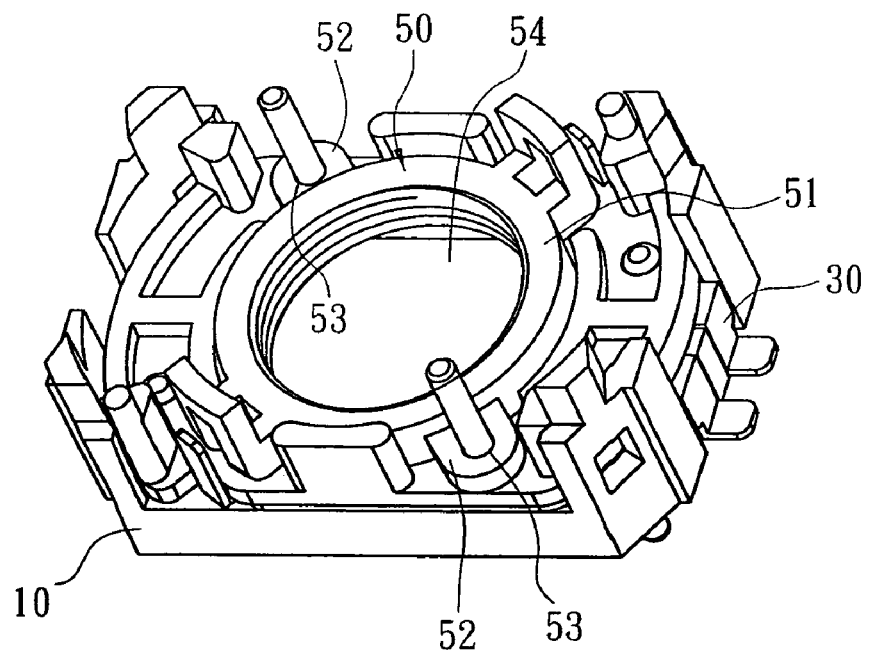
Figure 5F:
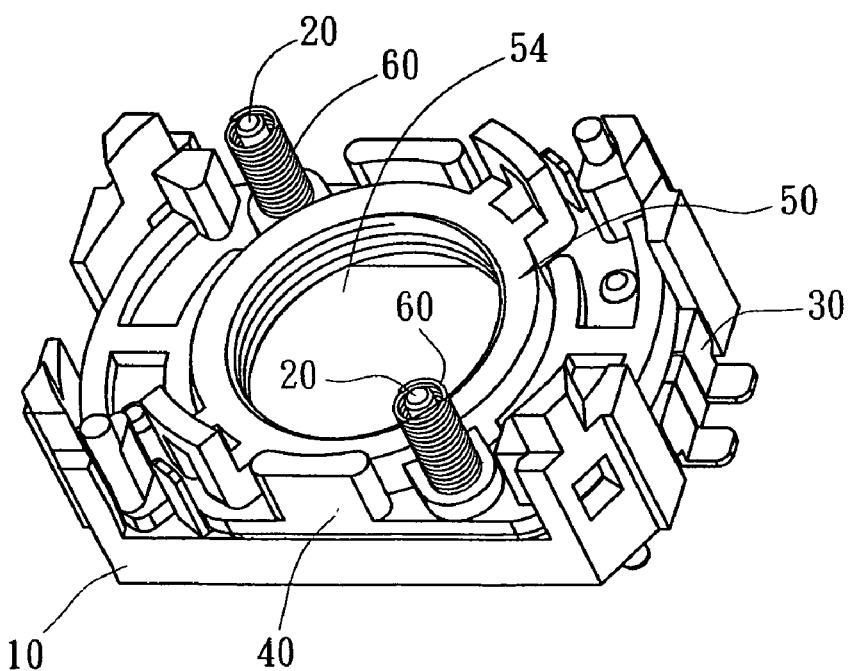
Figure 5G:
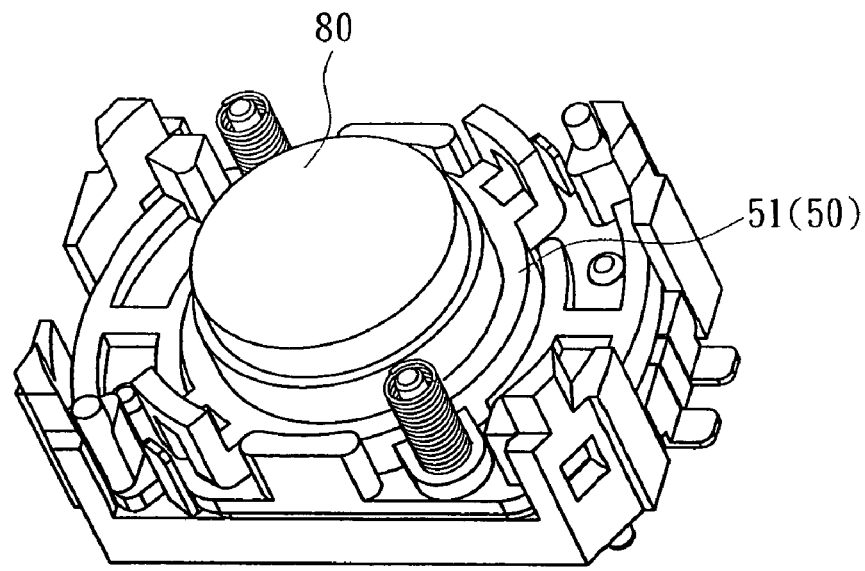
Figure 5H:
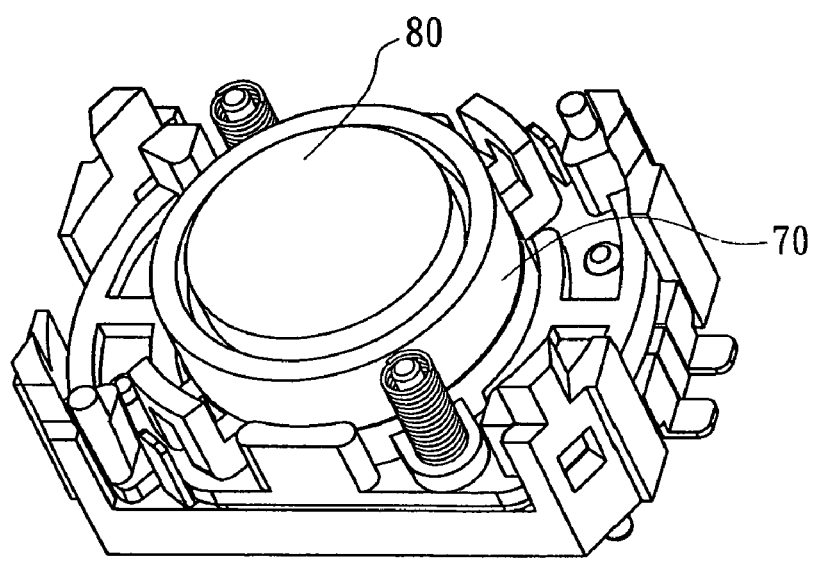
Figure 5I:
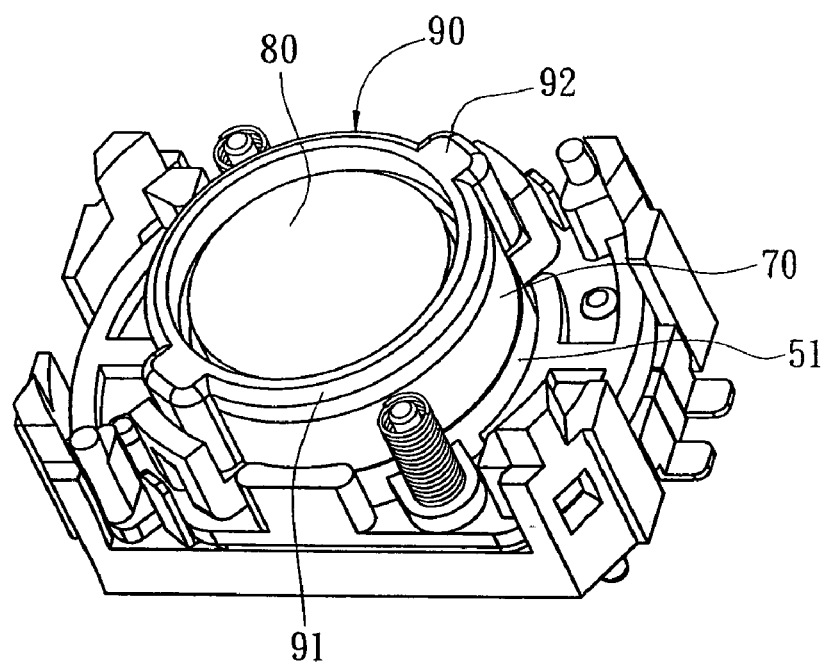
Figure 5J:
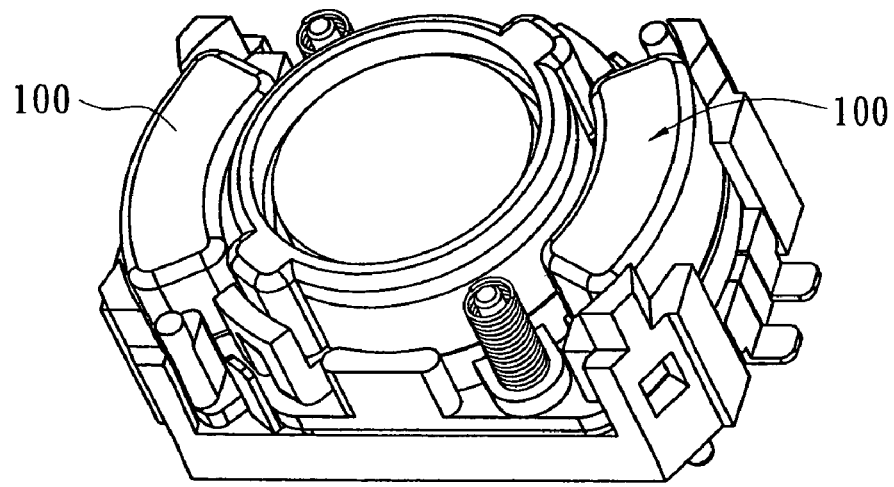

Refer to FIG. 5(A), the base is a rectangular frame with four stands 11 on four corners for fastening with the top cover 110. An insertion hole 12 on center of the base 10 is used to form an opening in optical pathway of lens 80. Two fixing holes 13 and two positioning pins 14 are disposed on two opposite angles respectively. Refer to FIG. 5(B), two guide pins 20 are respectively vertically mounted and fixed into the two fixing holes 13 on inner surface of the base 10. Refer to FIG. 5(C), two conductive plates 30 are two symmetrical copper plates. By the combination of the positioning hole 31 on the conductive plate 30 and the positioning pins 14 on the base 10, the two conductive plates 30 are disposed on the base 10 in insulated status and respectively connect to different electrodes by projecting pieces 32. Moreover, a central hole 33 is mounted between the two conductive plates 30 so as to form an opening in optical pathway of the lens 80 and two insertion holes 34 corresponds to and assemble with the two guide pins 20. Refer to FIG. 5(D), the bottom plate 40 is disposed over the two conductive plates 30 and is fixed on the conductive plates 30 by the assembling of the positioning pins 14 on the base 10 with the two positioning hole 42 on opposite angles. A central hole 41 is on the center of the bottom plate 40 to form an opening in the optical pathway of lens 80. Refer to FIG. 5(E), the lens holder 50 consists of a circular frame 51 and two symmetrical lugs 52 on edges of the frame 51. An insertion hole 53 is disposed on each of the two lugs 52 for assembling with the guide pin 20 while a central hole 54 is arranged on the lens holder 50 for accommodation of the lens 80.

Refer to FIG. 5 (F), two springs are mounted on the two guide pins 20 and the bottom side thereof presses against the two symmetrical lugs 52 of the lens holder 50. By the guide pins 20, stability for compression of the springs 60 is improved. Refer to FIG. 5 (G), the lens is fixed inside the central hole 54 of the lens holder 50. Refer to FIG. 5 (H), the coil 70 surrounds the circular frame 51 of the lens holder 50 and the head end as well as tail end of the coil 70 connects the two conductive plates 30 respectively. Refer to FIG. 5 (I), the top plate 90 is composed by a circular frame 91 and two fastening members 92 on edges thereof. By the two fastening members 92 locking with the lens holder 50, the top plate 90, the coil 70 and the lens holder 50 are disposed on circumference of the lens 80 so as to form the lens holder set 2. The coil 70 is clipped between the circular frame 91 of the top plate 90 and the corresponding circular frame 51 of the lens holder 50 so that the diameter of the coil 70 is reduced and the volume is minimized. Refer to FIG. 5 (J), instead of conventional circular magnet disposed outside the coil, the two magnets 100 are symmetrical arched magnets and respective clips on right and left sides of the coil 70. Thus the volume occupied by magnets 100 is also reduced. In usage, by changing electrodes and currents of head and tail ends of the coil 70 in combination with N and S poles of the magnets 100, electromagnetic force with various strength and directions is generated to drive the lens holder set 2 for focusing. Refer to FIG. 1, the top cover 110 is design in combination with the base 10 so as to fasten with each other to form the lens module 1 and clip as well as locate the two magnets 100 between the top cover 110 and the bottom plate 40. Moreover, the two springs 60, located between the inner surface of the top cover 110 and the lug 52 of the lens holder 50, press against inner surface of the top cover 110 and mount on the guide pin 20. Thus during the compression process, the two springs 60 are quite stable.

While in assembling and in use, the two springs 60 can be compression springs. When the top cover 110 fastens with the base 10, the springs 60 are pressed downwards by the top cover 110 to become compressed status. Meanwhile, the springs 60 also press the two symmetrical lug 52 of the lens holder 50 of the lens holder set 2 downwards so as to make the lens holder set 2 stop on "dead point" during the zoom-in/zoom-out process, this is the far focus position. The electromagnetic force between the coil 70 and the magnet 100 is generated forwardly. While the lens holder set 2 is at far focus, there is no current passing through the coil 70 so that no electromagnetic force is generated. Thus the lens holder set 2 stops at close focus. While focusing, certain amount of current passes through the coil 70 so as to generate electromagnetic force that drives the lens holder set 2 to move toward the shooting object and stop at close focus. When the electromagnetic force equals to the compression force of the two springs 60, the lens holder set 2 stops near the adjusted close focus position. Therefore, the lens holder set 2 moves from the far focus to the close focus by the electromagnetic force while turns back from the close focus to the far focus by restoring force of the compressed springs 60.

Compare with conventional lens modules, the lens module 1 according to the present invention has the following advantages:

(1) The coil 70 of the present invention is disposed between and is mounted inside the two corresponding circular frames 51, 91 so that the diameter and volume of the lens holder set 2 are reduced and thus the volume of the lens module is minimized.

(2) The traditional lens module includes a circular magnet disposed outside the coil so that the diameter of the module is increased while the present invention uses two arched magnets 100 clipped on left and right sides of the coil 70 symmetrically. And the magnet 100 is disposed between the top cover 110 and the bottom plate 40. Thus the components are simplified and the volume of the magnet 100 is reduced so as to minimize the volume of the lens module 1.

(3) By the two springs 60 that is disposed between the top cover 110 and the lug 52 of the lens holder 50 and assembled with the guide pin 20, the focusing process runs stably due to stable compression of the springs 60.

Figure 6:
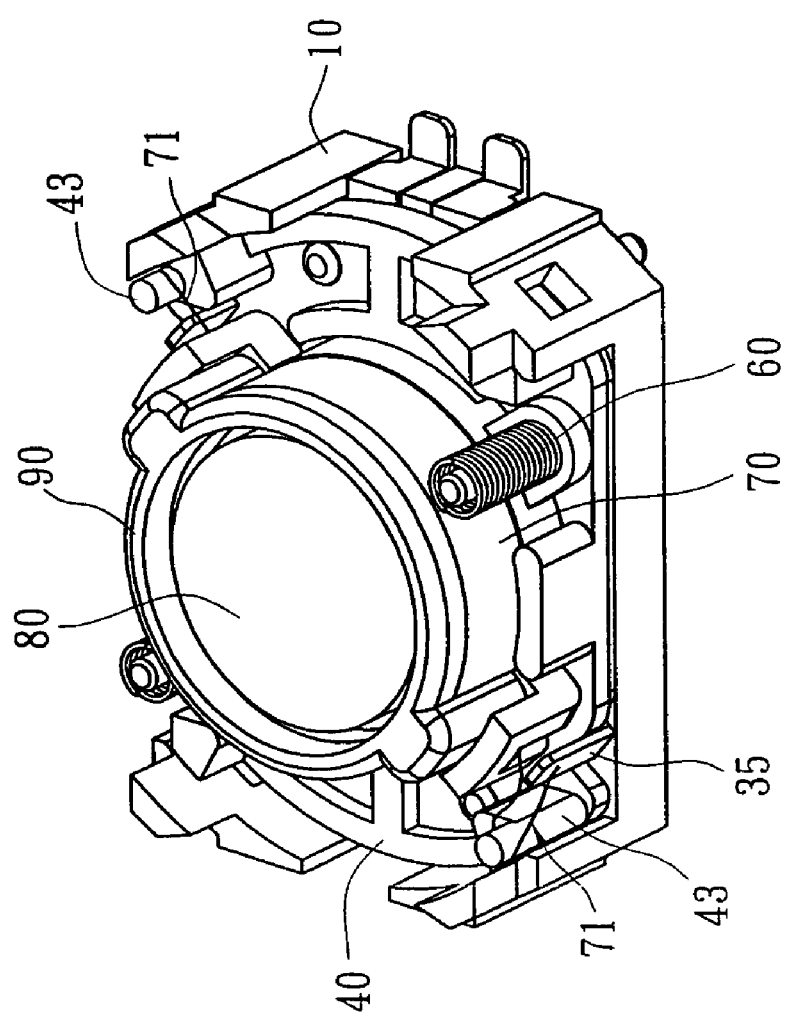
FIG. 6 is a schematic drawing of conduction of coils according to the present invention.

In addition, refer to FIG. 6 & FIG. 5(C), 5(D), the head part and the tail part of the coil 70 are respectively electrically connected with two conductive plates 30. A projecting piece 35 is disposed on the conductive plate 30 while a corresponding projective rod 43 is arranged on the bottom plate 40 so that wires 71 on the head part and the tail part of the coil 70 are wound on the projective rod 43 and then are being welded on the projecting piece 35 of the conductive plate 30 for preventing the wires 71 from breaking due to long term use of the lens holder set 2.

What is claimed is:

1. An auto-focus lens module comprising
a base that is a rectangular frame with four stands on four corners for fastening with a top cover while an insertion hole is on center thereof to form an opening in optical pathway of lens; two fixing holes are disposed on two opposite angles of inner surface of the base;
two guide pins respectively vertically mounted and fixed into the two fixing holes on inner surface of the base;
two conductive plates disposed on the base, respectively connect to different electrodes and a central hole is mounted between the two conductive plates so as to form an opening in optical pathway of the lens; an insertion hole is disposed on each of the conductive plates for being assembled with corresponding guide pin;
a bottom plate having with a central hole on the center thereof to form an opening in the optical pathway of lens disposed over the two conductive plates;
a lens holder having a circular frame, two symmetrical lugs on edges of the frame and a central hole for accommodation of a lens; an insertion hole for assembling with the guide pin is disposed on each of the two lugs;
two springs assembled with the two guide pins respectively and the bottom side thereof presses against the two symmetrical lugs of the lens holder;
the lens mounted and fixed on the central hole of the lens holder;
a coil disposed on the circular frame of the lens holder and the head end as well as tail end of the coil connects the two conductive plates respectively;
a top plate having a circular frame and two fastening members on edges of the circular frame; by the two fastening members locking with the lens holder, the top plate, the coil and the lens holder are disposed on circumference of the lens so as to form a lens holder set while the coil is clipped and fixed between the circular frame of the top plate and the corresponding circular frame of the lens holder;
two magnets that are symmetrical arched magnets clip on right and left sides of the coil respectively; and
a top cover in combination with the base to form a lens module; the two magnets locates between the top cover and the bottom plate while the two springs respectively presses against the inner surface of the top cover and thus being mounted between the inner surface of the top cover and the lug of the lens holder;
thereby the lens holder set is driven axially by electromagnetic force generated from the interaction between the coil and the magnets while the two springs assembled on the guide pin, elastically against between the lens holder set and the inner surface of the top cover make the lens holder set move stably in axial direction.

2. The auto-focus lens module as claimed in claim 1, wherein a projecting piece is disposed on the conductive plate while a corresponding projective rod is arranged on the bottom plate so that wires on the head part and the tail part of the coil are wound on the projective rod and then are being welded on the projecting piece of the conductive plate.

3. The auto-focus lens module as claimed in claim 1, wherein two positioning pins are disposed on opposite angles of inner surface of the base while corresponding positioning holes are disposed on the two conductive plates as well as on the bottom plate so as to assemble with the positioning pins of the base.

* * * * *